July 4, 1933.  F. AYER ET AL  1,916,196
METHOD OF TREATING ORES
Filed Aug. 6, 1930
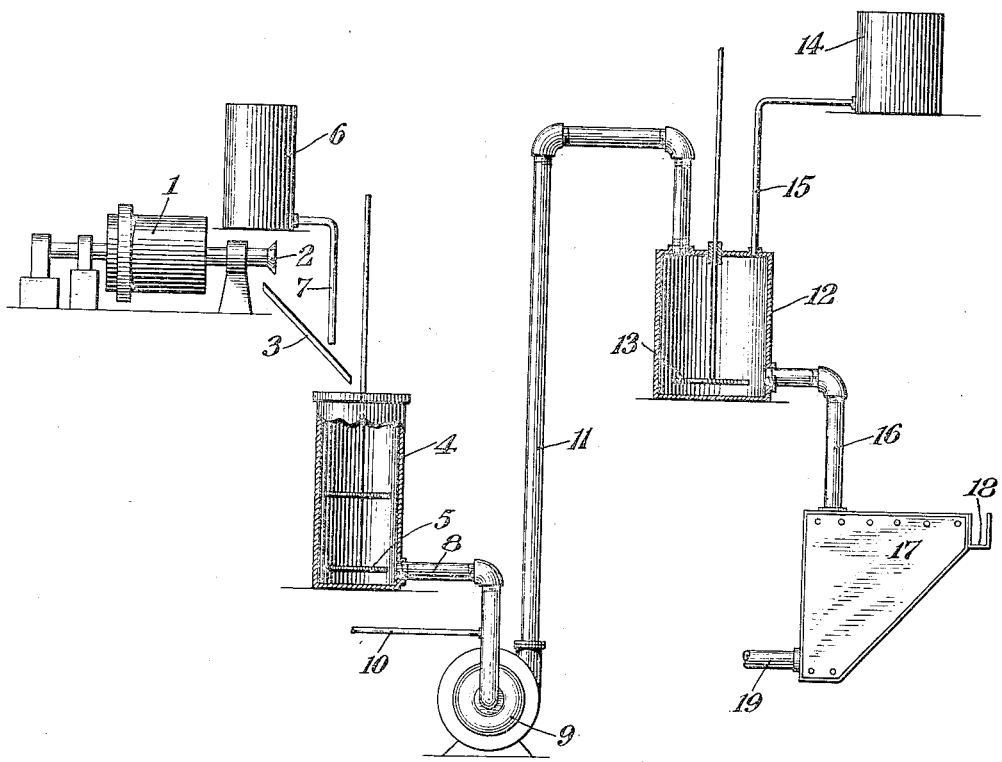
INVENTORS
Frank Ayer
Arthur Crowfoot
Harold Courtel Herivel
Paul Merrick Sorensen
BY
Gifford, Scott & Burgess
ATTORNEYS Patented July 4, 1933

1,916,196

UNITED STATES PATENT OFFICE

FRANK AYER, ARTHUR CROWFOOT, HAROLD TOURTEL HERIVEL, AND PAUL MERRICK SORENSEN, OF MORENCI, ARIZONA, ASSIGNORS TO PHELPS DODGE CORPORATION, OF MORENCI, ARIZONA, A CORPORATION OF NEW YORK

METHOD OF TREATING ORES

Application filed August 6, 1930. Serial No. 473,348.

In the flotation treatment of mixed ores, or ores containing both sulphide and non-sulphide minerals, it is well known that extreme losses of non-sulphide minerals occur and, to a lesser extent, of the sulphide minerals; the latter loss being due to the fact that a part of the sulphide minerals is filmed with oxide or other non-sulphide mineral which renders it refractory to the flotation process.

It is well known that the addition of soluble sulphide such as sodium sulphide, hydrogen sulphide and other soluble sulphides, assist in reducing the above mentioned losses. These soluble sulphides have been used in the past, in this connection, in a variety of ways, but their use has not been attended with signal success.

It is an object of this invention to provide a simple, efficient and economical method or process of recovering copper from ores by subjecting the ore to a treatment to obtain a definite range of hydrogen ion concentration and then bringing the ore into contact with a sulphidizing agent, such as sodium sulphide, hydrogen sulphide, calcium poly-sulphide or other suitable sulphidizing agents, thereby converting the tarnished sulphide mineral surfaces and the non-sulphide mineral surfaces of sulphide surfaces, or particles, and precipitating any copper in solution as sulphide and subjecting the mass to a flotation process to recover a concentrate.

It is well known that in sulphidizing practice it is not necessary to convert the entire mass of non-sulphide particles to a sulphide, but that it is sufficient to form a surface coating of sulphide on these particles. In the case of any copper sulphate, however, which may be contained in solution in the pulp, this is converted into sulphide by the action of the soluble sulphide used in accordance with the following reaction:

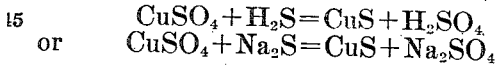

$$CuSO_4 + H_2S = CuS + H_2SO_4$$
or $$CuSO_4 + Na_2S = CuS + Na_2SO_4$$

Our invention relates to a process of treating mixed ores and especially ores containing sulphide minerals and ores containing sulphide minerals associated with minerals other than sulphide minerals; for example:—as in the case of copper minerals our invention relates to a process for treating mixed copper ores and especially ores containing copper sulphide minerals associated with copper minerals other than copper sulphide minerals, such as copper carbonates, copper oxides, etc., whether with or without other metallic minerals.

We have discovered and have proved by actual operation on a large scale that the yield when a soluble sulphidizing agent is used in the recovery of sulphide and non-sulphide metallic minerals from ores is surprisingly increased when the solution in which the ore is contained as a pulp preceding and during sulphidizing treatment has a hydrogen ion concentration of from about 0.00001584786 to about 0.00000031645 grams of ionized hydrogen per liter. In other words, the pulp solution must have from about $10^{-4.8}$ to about $10^{-6.5}$ grams of ionized hydrogen per liter, or as commonly expressed, as about pH 4.8 to about pH 6.5, and will hereinafter be expressed in a like manner.

We have also discovered that when soluble sulphides are applied to a pulp, the solution hydrogen ion concentration of which is either substantially above or substantially below the limits specified, the recovery of sulphide and non-sulphide minerals is very appreciably decreased, to an extent which causes it to fall below the recovery which is made by standard non-sulphidizing flotation practice.

Our invention consists of the steps of the process hereinafter described and claimed. In the accompanying drawing we have shown diagrammatically an apparatus suitable for carrying out our process.

Referring to the drawing, 1 represents a grinding mill (either in closed circuit with some suitable classifying mechanism, or in open circuit) suitable for crushing the ore to the required degree of fineness having a discharge outlet 2 through which the finely ground pulp may be discharged to a trough or launder 3 for conveyance to a conditioning tank or tanks 4 provided with suitable agitating mechanism 5. A conditioning agent container 6 provided with suitable outlet 7 supplies conditioning agent (either acid or alkali) for the pulp in trough 3. A discharge pipe 8 leads from tank 4 to a pump or other sulphidizing agent contact apparatus 9. Hydrogen sulphide gas or other suitable sulphidizing agents 10 from a suitable source enters pipe 8 ahead of pump or other sulphidizing agent contact apparatus 9. Pump or other suitable sulphidizing agent contact apparatus discharge 11 enters tank 12, which is used as a means for conditioning pulp with flotation reagents, if such conditioning is necessary; and is equipped with some means 13 of agitating the pulp. Suitable flotation reagents flow from container 14 into pulp in tank 12 through pipe 15. Pulp flows from conditioning tank 12 through discharge pipe 16 into flotation machine 17 provided with a concentrate overflow take-off 18 and a residue discharge outlet 19.

In carrying out our process, for example: mixed ores containing copper in the sulphide and/or non-sulphide form and either with or without other metals, such as silver or iron, is put into grinding mill 1 where it is ground to the desired degree of fineness in the presence of water. The finely ground pulp is then discharged through outlet 2 into launder 3 and mixed with conditioning agent (either acid or alkali) from container 6 and delivered to agitating tank or tanks 4 in which the ore particles are maintained in a constant state of suspension assuring intimate contact of the metalliferous particles with the conditioning agent. The pulp is discharged from tank 4 to pump 9. The hydrogen ion concentration of the pulp solution as it leaves tank 4 must have a pH value not lower than pH 4.8 and not higher than pH 6.5. Hydrogen sulphide gas or other suitable sulphidizing agent is injected into the pulp stream immediately ahead of the pump or other sulphidizing agent contact apparatus 9, where by violent agitation intimate contact between the sulphidizing agent and the metalliferous particles and dissolved salts is obtained. From pump or other sulphidizing agent contact apparatus 9 the pulp passes to conditioning tank 12 where an alkaline metal xanthate and pine oil, or an alkaline metal xanthate and an alcoholic mercaptan and pine oil, or any other suitable flotation reagent, or combination of reagents, is added. From conditioning tank 12, the pulp passes to flotation machine 17 where the pulp is subjected to flotation treatment well known to those skilled in the art, and a concentrate recovered as a froth overflow at 18 while the tailing residue passes out through discharge 19.

The process is based on our discovery that when a sulphidizing agent such as sodium sulphide, hydrogen sulphide or calcium polysulphide or other soluble sulphide is introduced into an ore pulp having a solution hydrogen ion concentration of from pH 4.8 to pH 6.5 grams of ionized hydrogen per liter, the percentage of sulphide mineral recovery is surprisingly increased over the percentage of recovery obtained by other known processes. This we think is due to the reactivation of sluggish sulphide minerals and the formation of new sulphide surfaces on tarnished or surface altered sulphide particles. Also that the percentage of non-sulphide metalliferous minerals recovered is much greater than in any other flotation process due to the formation of a partial or complete adherent sulphide coating on the non-sulphide mineral particles when sulphidized in a pulp solution having a hydrogen ion concentration as noted above.

When using hydrogen sulphide gas as a sulphidizing agent the tendency in former practices was to use an excessive amount of gas and to later remove this excess gas prior to the flotation treatment of the pulp by some mechanical apparatus in the flow sheet. In our process when using hydrogen sulphide gas as above the amount used per ton of ore treated is so small that it has been found unnecessary to adopt any special means for removing excess gas prior to the treatment of the pulp by the flotation process.

The amount of hydrogen sulphide gas or other soluble sulphides necessary to be used to secure satisfactory results will vary with different ores and should be determined experimentally in the case of each ore or combination of ores to be treated.

In the case of Morenci ores, of two different grades, we have found the following average amounts of hydrogen sulphide gas to yield satisfactory results in concentrator scale experiments:

| | Humboldt ore | Clay mine ore |
| --- | --- | --- |
| Assay % total copper | 1.823 | 1.262 |
| Assay % acid soluble copper | 0.175 | 0.081 |
| Cu. ft. of H$_2$S gas used per ton of ore | 6.2 | 2.5 |

When using soluble sulphides other than hydrogen sulphide gas, such as calcium polysulphide, (CaSx) or sodium sulphide (Na$_2$S), we have found that the following amounts produced satisfactory results when treating Humboldt mine ore:

|  | Humboldt mine ore |
| --- | --- |
| Assay % total copper | 1.81 |
| Assay % acid soluble copper | 0.20 |
| Pound calcium poly-sulphide (CaSx) used per ton of ore | 0.20 |
| Pound sodium sulphide (Na$_2$S) (62% Na$_2$S) used per ton ore | 0.50 |

We have also found that as the soluble salts contained in an ore increase or decrease, the amount of soluble sulphides required to be added in order to secure satisfactory results will also correspondingly increase or decrease.

In making a test of this process on any ore, we take 1000 grams of the ore and grind this in a laboratory mill to the required degree of fineness (say 2% plus 65 mesh and 75% minus 200 mesh) without the addition of acid or alkali. The ground product is then transferred from the mill to a laboratory flotation machine and diluted with water to flotation density (say 17% to 20% solids).

The amount of acid or alkali necessary to obtain the required hydrogen ion concentration in the pulp solution is then added and the pulp agitated for a period of five to ten minutes. The soluble sulphide is then added and the pulp again agitated for a similar period to that above mentioned. Suitable flotation reagents are then added to the pulp, such as xanthate and pin oil and a froth concentrate is then removed for a ten minute period.

Several tests of this nature may be necessary in the case of each individual ore before the exact amount of acid or alkali, necessary to obtain the desired hydrogen ion concentration, is determined and also before the correct amount of soluble sulphide, necessary to be added, is determined.

As a corrollary, or subsidiary, to our main process, we may treat the original ore, or the residual pulp from flotation by any of the well-known methods of gravity concentration to recover any of the naturally occurring metals or minerals susceptible to such treatment, also by the ordinary method of flotation, either before or after sulphidizing at the pH value of from pH 4.8 to pH 6.5. It will be understood by those skilled in the art that various changes in the construction of the apparatus and in the steps of the process may be made without departing from the spirit of our discovery as claimed.

The term "metalliferous ores" as used herein is intended to include any and all forms of ore containing a desired metal. It is intended to specifically include sulphides and/or oxides and/or carbonates and/or silicates and/or sulphates, alone or mixed, in any proportion also segregated fines secured by wet or dry methods before or after crushing and/or flotation cleaner cell middling products and/or dump or stacked tailings or current tailings from any process of concentration.

By the term "hydrogen ion concentration" we mean a certain definite amount of ionized hydrogen per liter of pulp solution. The hydrogen ion concentration of the pulp solution is secured and maintained by the controlled addition of an acid or an alkali to the pulp. If we find that the hydrogen ion concentration of a pulp solution is either too high or too low for our purpose, we add an alkali if too high and an acid if too low.

The hydrogen ion concentration of the pulp solution is determined by either of two well-known methods, the colorimetric method and the electrical conductivity method. In our work, for convenience and simplicity we prefer to use the colorimetric method.

We prefer to conduct our process under normal atmospheric pressure conditions and normal pulp solution temperature conditions, but it may be carried out successfully under atmospheric pressure conditions and pulp solution temperature conditions, which are above or below normal, without in any way deviating from the spirit of our invention as long as the hydrogen ion concentration range remains within our specified limits.

By grinding the ore to the "desired fineness" we mean grinding the ore to a point of fineness at which the valuable minerals become separated from the gangue minerals. This point will vary with different ores, some requiring to be ground to a minus 48 mesh size only and others to a minus 100 mesh size, in order to effect the above mentioned separation.

In the case of Morenci ores, we find that grinding to 2% on 65 mesh and 75% minus 200 mesh effects the above mentioned separation as far as it is commercially practicable to do so.

We claim:

1. The process of treating metalliferous ores which consists in first bringing an aqueous suspension of the ore to a hydrogen ion concentration (grams of ionized hydrogen per liter) value between pH 4.8 and pH 6.5, and maintaining it at this concentration while subjecting it to the action of a sulphidizing agent, and separating the desired minerals from said suspension.

2. The process of treating metalliferous ores which consists in first bringing an aqueous suspension of the ore to a hydrogen ion concentration (grams of ionized hydrogen per liter) value between pH 4.8 and pH 6.5, and maintaining it at this concentration while subjecting it to the action of a sulphidizing agent, and separating by the flotation process the desired minerals from said suspension.

3. In a process of treating metalliferous ores, the step of sulphidizing the ore while maintaining it in a liquid suspension having a hydrogen ion concentration between pH 4.8 and pH 6.5.

4. In a process of treating copper bearing ore, the step of sulphidizing the copper in an aqueous suspension while maintaining said suspension at a hydrogen ion concentration value between pH 4.8 and pH 6.5.

5. A process of treating metalliferous ores, which consists in placing the hydrogen ion concentration of the pulp solution between $10^{-4.8}$ and $10^{-6.5}$ grams of ionized hydrogen per liter (pH 4.8 to pH 6.5), then introducing a sulphidizing agent and then separating by the flotation process a concentrate containing the desired minerals.

6. A process of treating copper ores, which consists in subjecting the ore to the action of a chemical compound in quantity sufficient to place the hydrogen ion concentration of the pulp solution between $10^{-4.8}$ and $10^{-6.5}$ grams of ionized hydrogen per liter, then introducing a sulphidizing agent or agents, and then separating by the flotation process a concentrate containing the desired minerals.

7. A process of treating mixed ores containing sulphides with oxides and/or carbonates, and/or silicate, and/or sulphates, which consists in subjecting the ore to the action of a chemical compound in quantity sufficient to place the hydrogen ion concentration of the pulp solution between $10^{-4.8}$ and $10^{-6.5}$ grams of ionized hydrogen per liter, then introducing a sulphidizing agent or agents, then separating by the flotation process a concentrate containing the desired minerals.

8. The process of recovering copper from its ores, which consists in forming a pulp solution of said ores, adjusting the hydrogen ion concentration of such solution to a value between pH 4.8 and pH 6.5, then introducing a sulphidizing agent into the solution and then separating the copper compounds from the pulp.

9. The process of recovering copper from its ores, which consists in forming a pulp solution of said ores, adjusting the hydrogen ion concentration of such solution to a value between pH 4.8 and pH 6.5, then introducing a sulphidizing agent into the solution and then separating the copper compounds from the pulp by the flotation process.

FRANK AYER.
ARTHUR CROWFOOT.
HAROLD T. HÉRIVEL.
PAUL M. SORENSEN.